United States Patent [19]

Statz

[11] 4,361,367
[45] Nov. 30, 1982

[54] SELF LUBRICATING BEARING

[76] Inventor: Robert G. Statz, 2478 N. 66th St., Milwaukee, Wis. 53213

[21] Appl. No.: 254,942

[22] Filed: Apr. 16, 1981

[51] Int. Cl.³ .............................................. F16C 33/10
[52] U.S. Cl. ....................................... 308/78; 308/99; 308/239
[58] Field of Search ................... 308/78, 99, 102, 104, 308/111, 125, 132, 240, 239

[56] References Cited

U.S. PATENT DOCUMENTS

| 983,025 | 1/1911 | Chalmers . | |
|---|---|---|---|
| 1,156,071 | 10/1915 | Farr . | |
| 2,048,763 | 7/1936 | Whiteley | 308/125 |
| 2,067,034 | 1/1937 | Whiteley | 308/36.3 |
| 2,698,774 | 1/1955 | Haller et al. | 308/240 |
| 2,710,236 | 6/1955 | Love | 308/70 |
| 2,964,363 | 12/1960 | Daykin et al. | 308/121 |
| 3,013,847 | 12/1961 | Gits | 308/125 |
| 3,352,612 | 11/1967 | Endier | 308/240 |

FOREIGN PATENT DOCUMENTS 794098  2/1936  France .

Primary Examiner—Lenard A. Footland
Attorney, Agent, or Firm—Michael, Best & Friedrich

[57]         ABSTRACT

A self lubricating bearing including a bearing member body comprised of sintered powdered metal, and a bore extending through the body and defining a cylindrical wall. A plurality of cavities are formed in the wall, the cavities extending radially outwardly with respect to the shaft and into the bearing member body, and the cavities being spaced equally around the bore. A bearing shaft is housed in the bore and is supported by the bearing material. A bearing member is housed in each of the cavities and extends into the bore to engage the shaft, the bearing members each comprising an oil impregnated polymer.

5 Claims, 3 Drawing Figures

SELF LUBRICATING BEARING

FIELD OF THE INVENTION

The present invention relates to self lubricating bearings and to bearings having means for supplying lubrication to the bearing working surface or surfaces.

BACKGROUND PRIOR ART

Examples of self lubricating bearings are illustrated in the U.S. Daykin et al. Pat. No. 2,964,363, the U.S. Haller et al. Pat. No. 2,698,774; the U.S. Whiteley Pat. No. 2,048,763; the U.S. Farr Pat. No. 1,156,071; the U.S. Chalmers Pat. No. 983,025; the U.S. Whiteley Pat. No. 2,067,034; and the U.S. Love Pat. No. 2,710,236.

Attention is also directed to the U.S. Gits Pat. No. 3,013,762; the U.S. Eudier Pat. No. 3,352,612; and French Pat. No. 794,098.

As is illustrated in those patents, it is known to utilize lubricant filled reservoirs on or communicating with the sliding surfaces of self-lubricating bushings and bearings wherein the reservoirs are supplied with lubricant prior to the assembly of the structure and wherein the lubricant is distributed between the sliding surfaces through frictional contact of one of the moving surfaces with the surface of the lubricant disposed in the reservoirs. Such rigid type bushings having prelubricated reservoirs suffer a disadvantage in possible depletion of a portion of the lubricant contained in the reservoirs through absorption in the bearing structure, expulsion from the system, or evaporation which decreases the effectiveness of lubrication since the lubricant gradually recedes from contact with the moving surfaces as its volume is diminished. Devices of the prior art have attempted to overcome this disadvantage by providing reservoir systems which route the lubricant discharged from the reservoirs by centrifugal force, back to the reservoirs thereby providing a recovery and replenishing circuit for the bushing. A disadvantage here lies in the complexity required to achieve this recirculation and also the necessity of a relatively high rotational speed to accomplish the recirculation effect. This solution is unsuitable in lower speed application where centrifugal forces are not present.

SUMMARY OF THE INVENTION

The present invention includes an improved self lubricating bearing having a bearing member body comprised of sintered powdered metal, the sintered powdered metal body including a central bore. A plurality of cavities are formed in the wall of the bore, the cavities being spaced equally around the bore. A bearing shaft is housed in the bore. Oil impregnated microporous polymer bearing members are housed in each of the cavities, the polymer bearing members each including a portion projecting radially inwardly from the respective housing containing the bearing member and into the bore.

One of the features of the invention is that the microporous polymer material bearing members contain minute passages or channels containing lubricating oil such that the oil can be deposited on the shaft as needed. The microporous polymer members also function to absorb and store any excess lubricating oil, and thereby control the amount of lubricating oil supplied to the shaft and bearing body surfaces.

In another preferred form of the invention, the powdered metal bearing member is impregnated with oil to thereby provide a further source of lubricating oil.

Various other features and advantages of the invention will be set forth in the following description, in the claims, and in the drawings.

Figure 2:
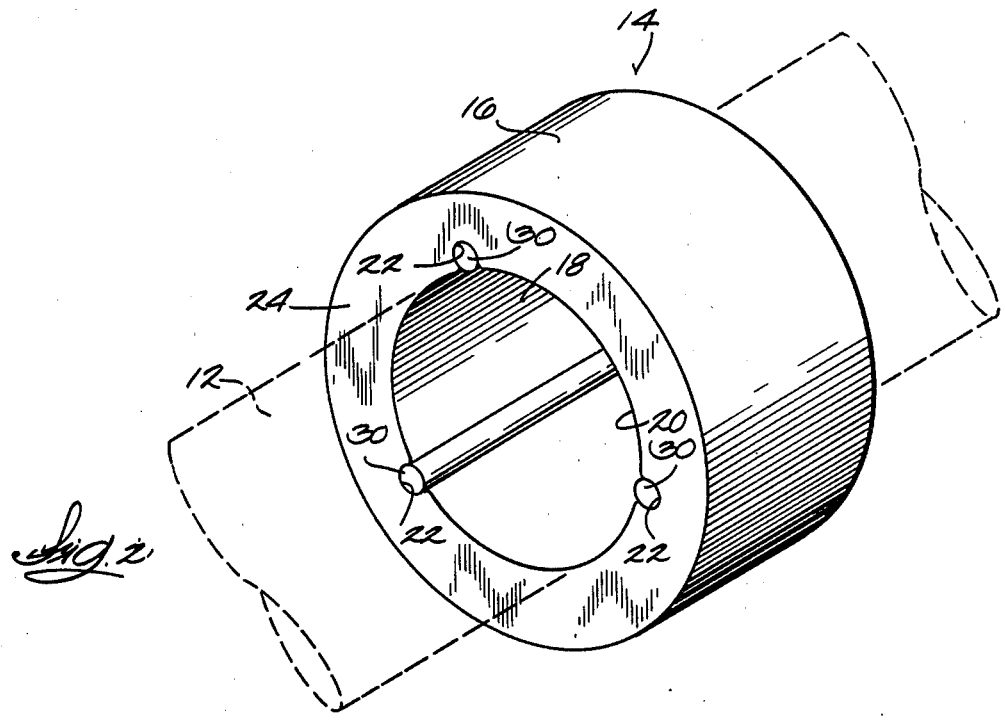
FIG. 2 is an enlarged perspective view of the bearing illustrated in FIG. 1.

Before describing a preferred embodiment in detail, it is to be understood that the invention is not limited in its application to the details of construction and to the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

DESCRIPTION OF A PREFERRED EMBODIMENT

Figure 1:
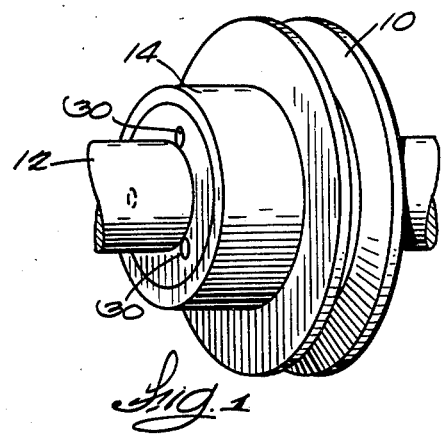
FIG. 1 is a perspective view of an idler pulley including a bearing embodying the present invention.
Figure 3:
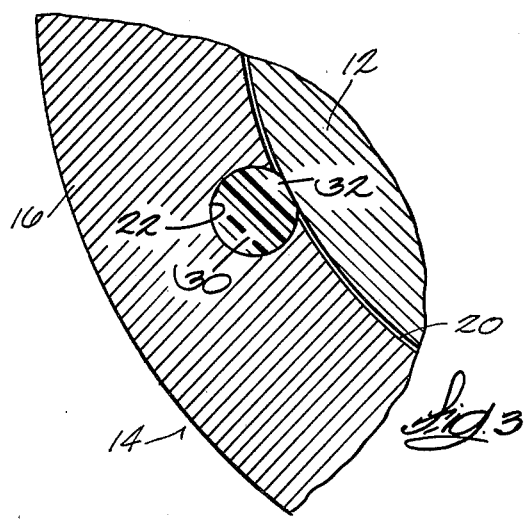
FIG. 3 is an enlarged partial cross section view of the bearing and shaft illustrated in FIG. 1.

Illustrated in FIG. 1 is an idler pulley 10 supported for rotation on a shaft 12 by a bearing 14 embodying the present invention. While the bearing 14 is illustrated as being used with an idler pulley, it will be appreciated by those skilled in the art that the illustrated bearing 14 could be employed in a variety of applications such as for rotatably supporting bogie wheels, idler wheels, idler sprockets, quill assemblies, lawn mower deck spindle assemblies, pillow blocks and other devices requiring bearings.

In a preferred embodiment of the invention the bearing 14 includes a body 16 comprised of sintered powdered metal such as powdered iron impregnated with lubricating oil. An example of a suitable bearing material is one comprised of a powdered metal containing 0.6 to 1.0% copper and the balance iron and with a sintered density of 6.5 to 6.7% gr/cc.

The body 16 includes a central longitudinally extending bore 18 housing the shaft 12, the bore 18 including a peripheral wall 20. The body 16 also includes a plurality of elongated cavities 22 formed in the wall 20 of the bore 18, the cavities 22 being equally spaced around the bore. While in the illustrated arrangement, three elongated cavities 22 are shown, in other constructions more elongated cavities 22 could be provided, though it is preferred that they be spaced equally around the bore. In the illustrated construction the elongated cavities 22 are aligned in mutually parallel relation and in parallel with the longitudinal axis of the bore 18. The elongated cavities are also shown as having a length equal to that of the bore 18 and with the cavities extending from one face 24 of the body to the other face. In the illustrated construction the elongated cavities 22 are circular in cross section and open into the bore 18 of bearing body 16.

The bearing 14 also includes polymer bearing members 30 housed in the elongated cavities and including a portion 32 projecting radially inwardly with respect to the longitudinal axis of the bore 18 so as to project into the bore and to engage the surface of the shaft 12. The bearing members 30 are comprised of a molded microporous polymer material impregnated with lubricating oil and having the characteristics of being comprised of a low friction material and of secreting oil onto the surface of the shaft 12 to form a film of oil between the shaft and the wall of the bore and also being adapted to absorb any excess oil therebetween by means of capillary action. In one preferred form of the invention, the bearing members 30 can be comprised of an oil impregnated microporous polymer material such as MICRO-POLY produced by Projected Lubricants, Inc., Denver, Colorado. Such material can be molded to form bearing members 30 which can be longitudinally inserted into the elongated bores 22. The bearing material can be secured in place by staking the opposite ends of the members.

The MICRO-POLY bearing material generally comprises a polymer which is adapted to be molded into rigid shapes and is interlaced with microscopic channels adapted to be filled with lubricating oil. Some of the microscopic channels extend to surface portions of the bearing members which are engaged by the shaft 12 and capillary action in the microscopic channels functions to either convey oil to the space between the shaft and the wall in those cases where oil is needed, or to absorb oil into the bearing members in the event excess oil exists between the shaft and the wall of the bore.

While the body 14 of the bearing is shown as having a generally cylindrical shape, it should be understood that the bearing could have a variety of shapes or sizes as dictated by the intended application of the bearing.

Various other features and advantages of the invention are set forth in the following claims.

I claim:

1. A self lubricating bearing comprising: a bearing member body comprised of sintered powdered metal, a bore through said body and defining a cylindrical wall, a plurality of cavities formed in said wall, said cavities extending into said bearing member body, said cavities being spaced equally around said bore, a bearing shaft housed in said bore and being supported by said bearing material, a bearing member in each of said cavities and extending radially inwardly with respect to the longitudinal axis of the bore from said cavities into said bore to engage said shaft, said bearing members comprising an oil impregnated polymer.

2. A self lubricating bearing as set forth in claim 1 wherein said body is impregnated with oil.

3. A self lubricating bearing as set forth in claim 1 wherein said cavities are elongated and extend along said bore and parallel to the longitudinal axis of said bore.

4. A self lubricating bearing as set forth in claim 1 wherein said bearing material comprises microporous polymer material having internal passages containing lubricating oil.

5. A self lubricating bearing comprising: a bearing member body comprised of sintered powdered metal impregnated with oil, a bore through said body and defining a cylindrical wall, a plurality of cavities formed in said wall, said cavities extending into said bearing member body, said cavities being spaced equally around said bore, and said cavities being elongated and extending along said bore and parallel to the longitudinal axis of said bore, a bearing shaft housed in said bore and being supported by said bearing material, a bearing member in each of said cavities and extending radially inwardly with respect to the longitudinal axis of the bore from said cavities into said bore to engage said shaft, said bearing members comprising microporous polymer material having internal passages containing lubricating oil.

* * * * *